Sept. 12, 1944. H. H. BLAU ET AL 2,357,993
GLASS WORKING APPARATUS
Original Filed March 7, 1940
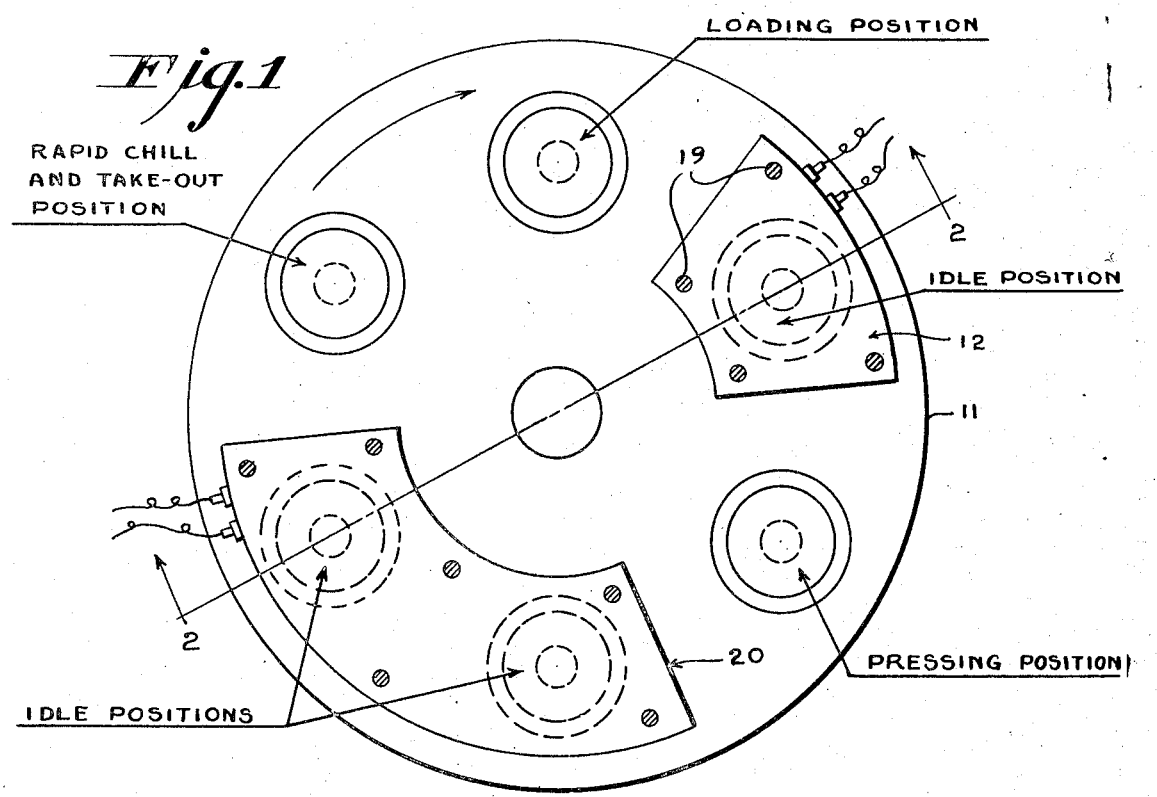
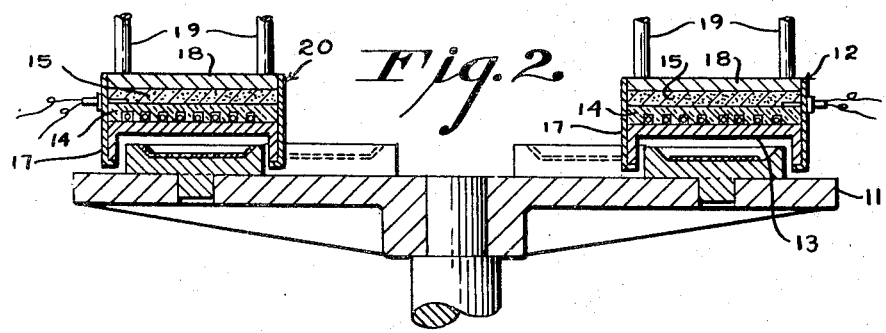
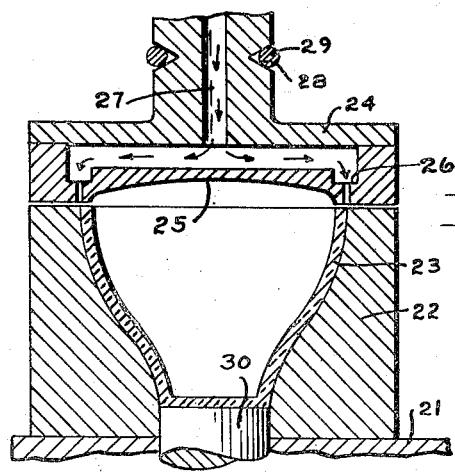
Inventor
HENRY H. BLAU
AND RAYMOND W. KELL
By F. H. Knight
Attorney Patented Sept. 12, 1944

2,357,993

UNITED STATES PATENT OFFICE 2,357,993

GLASSWORKING APPARATUS

Henry H. Blau, Elmira, N. Y., and Raymond W. Kell, Charleroi, Pa., assignors to Corning Glass Works, Corning, N. Y., a corporation of New York Original application March 7, 1940, Serial No. 322,838. Divided and this application February 26, 1941, Serial No. 380,732

7 Claims. (Cl. 49—14)

Our invention relates to glass working apparatus and is particularly concerned with the improvement of the surface and/or opacity and color of glass articles.

It is quite often the practice to fabricate a glass article and to thereafter subject it to some form of heat treatment to improve its surface and in certain instances its opacity or color.

The prime object of our invention is apparatus for the improvement of the surface appearance of a glass article coincident with its fabrication and is a division of our co-pending application Serial Number 322,838, filed March 7, 1940, now Patent No. 2,314,812, granted March 23, 1943.

Another object is apparatus for heat treating thermally opacifiable glass articles during their fabrication to impart to them exceptional light reflecting qualities.

Other objects of our invention will become apparent from a further perusal of the specification and the accompanying drawing.

Our invention embodies the use of a device associated with a glass fabricating apparatus which transmits heat by reflection and/or radiation to a charge after being deposited in a mold and which tends to erase the effect produced on the charge by a severing apparatus. The heating action of such a device also prevents formation of surface skin on the charge prior to its being contacted by the pressing plunger enabling such plunger to impart a substantially strain-free inner ware surface thereto, thereby reducing strain release breakage prior to annealing.

Our invention also embodies the use of a similar device which transmits heat to an article immediately after fabrication and while still in the mold, for a sufficient time period to improve the surface appearance and/or optical qualities of the article irrespective of the character of glass of which it is composed, the opacity and light reflective quality when thermally opacifiable glass is employed, and similarly improves the color of articles composed of other glasses of the heat developed color type. Also, the action of such devices tends to lower the temperature gradient in the ware while in the mold, which brings about a better strain distribution in the glass thereby further reducing the danger of strain release breakage prior to annealing and the time involved therein.

For the purpose of teaching the present invention, the same has been illustrated as applied to a conventional form of press wherein a plurality of molds are arranged on a rotating table, although the invention may as well be applied to other forms of multimold glass presses.

Fig. 1 of the accompanying drawing is a plan view of the table and molds of a six mold rotating table press having our invention embodied therein;

Fig. 2 is a sectional view on lines 2—2 of Fig. 1; and

Fig. 3 illustrates, in sectional elevation, a modified form of apparatus embodying our invention.

Referring to Figs. 1 and 2, a heat reflecting unit, generally designated 12, comprises a heat reflecting plate 13 provided with an electric heating unit 14 having a backing 15 of thermal insulation. The parts 12—15 are held within a sheet metal sleeve 17 attached to a support 18 arranged over an idle position occupied by a mold immediately subsequent to its receipt of a charge of glass. The support 18 is suspended from above by suitable rods 19.

The heating unit 14 is not an essential feature of the reflecting unit, but may be employed to store heat in the reflecting plate prior to the commencement of pressing operations so that the first pieces of ware made will have the benefit of heat imparted to them by radiation from the heat reflecting plate as well as by reflection, or to increase the amount of heat directed into the glass by the reflecting unit 12 throughout an operating run.

A second heat reflecting unit 20 is arranged over those mold positions intermediate those at which pressing and take-out of pressed articles occurs. The latter unit is of the same form of construction as that of unit 12 and functions in a similar manner to heat the surface of the finished article.

It has been found that by use of a heat reflecting unit 12, as above described, even without resorting to use of its heating element, sufficient heat is reflected back into the glass to substantially obliterate the shear marks, and to prevent formation of a skin on the surface of the charge while in the idle position where it tends to flatten out into a more perfect disc for free pressing.

By the use of the unit 20 sufficient heat is fed back into the finished articles to, in effect, fire polish them, making the subsequent step of fire polishing unnecessary. Also, the use of heat reflecting unit 20 further assists in the equalization of heat distribution in the molds, thereby prolonging their life. The reflecting units, by preventing radical temperature gradients in the ware while in the molds, enables them to more uniformly cool the article at all points of contact which, as hereinbefore mentioned, brings about a better strain distribution in the article. In the fabrication of thermally opacifiable and heat developed colored glass articles, equalization of heat distribution while in the molds produces better quality of ware in that the degree of opacity or color develops more uniformly over the entire surface of the article than occurs in conventional practice.

In the modified form of the invention illustrated in Fig. 3, the numeral 21 designates a fragment of a mold table which may be similar to the one illustrated in Figs. 1 and 2. Arranged on table 21 is an I. E. S. reflector mold 22 containing a reflector 23 in the position to which it is advanced immediately after the pressing operation and while another mold of the press (not shown) is receiving a charge. In the position shown the reflector is under the influence of a heat reflecting unit 24 in axial alignment with the reflector. The unit 24 has a reflecting surface 25 surrounded by a row of air supply apertures so located as to direct jets of air toward the line of juncture of the reflector and inner mold wall. Air is supplied from a suitable air chamber 26 supplied with air via the bore 27 in the stem of the unit 24. This unit 24 is supported from overhead in any suitable manner (not shown) and is grooved at 28 to accommodate a belt 29 by means of which it is rotated from a suitable power source (not shown).

In employing the foregoing arrangement a heat reflecting unit, such as 12 of Figs. 1 and 2, may or may not be employed, as desired. If such unit is employed, it functions in the manner already described and therefore needs no further discussion. In the fabrication of certain forms of ware such, for example, as an I. E. S. reflector commonly made of opacifiable glass, the surface finish and character of opacification determine its reflecting qualities. Such glass when pressed is wholly transparent, opacification occurring at a lower temperature. In conventional practice, this temperature is reached first by the surfaces of the reflector in contact with the mold, because these surfaces are quite rapidly chilled by dissipation of heat through the mold. It has been found that better results can be obtained, in conjunction with the use of a heat reflecting unit, by removing the reflector from contact with the mold to halt the rapid cooling of its outer surface and also so that the heat from the reflecting unit is enabled to penetrate more deeply into the reflector wall. It is to accomplish this that the provision has been made to direct streams of air toward the junction of the mold and reflector. These air streams function as wedges to free the reflector from the mold thus permitting a positive air pressure to build up between the mold and reflector to raise it from contact with the mold thereby stopping conduction of heat from the glass into the mold and enabling the more effective action of the reflector unit. Also, as soon as there is any space between the mold and article, the mold, which may be chrome plated, functions as a heat reflecting surface and therefore assists rather than hinders the heat reflecting unit 24. Ware, which has been subjected to the action of the combination of heat reflecting units 14 and 24, because of removal of the ware from contact with the mold before the surface is materially chilled, contains a better balance of strain in the inner and outer surfaces of the article than is otherwise obtained, thereby reducing strain release breakage prior to the annealing treatment, even more than is possible by use of the combination of heat reflector units 14 and 20.

Rotation of the unit 24 is not absolutely essential, but has been found to produce slightly better results than when the unit is held stationary. Also, results similar to those obtainable by use of the heat reflecting unit 24 may be obtained by substitution of a heat reflecting unit 20 for unit 24 and slightly raising the article from contact with the mold walls by means of its knockout pin 30. The pneumatic raising of the article is preferable, however, as there is less danger of distortion of the article.

What is claimed is:

1. In a glass working apparatus, a plurality of molds movable through loading, forming, idle, and take-out positions, a heat reflecting unit and means to support said unit over an idle position, said unit having passages from which streams of fluid may be directed toward the juncture of the inner mold surface and a formed article contained therein while the mold is in an idle position.

2. In a glass working press, a plurality of molds movable through loading, pressing, idle, and take-out positions, a heat reflecting unit and means to support said unit over an idle position, means for rotating said unit about the vertical axis of the mold, and said unit having passages for directing air toward the line of juncture of the mold and a freshly pressed article contained therein while the mold is in an idle position.

3. The combination, with a glass article press wherein a plurality of molds are successively brought into a position to receive charges of plastic glass and are in like order brought into a pressing position where the charges are pressed into articles of desired forms and then in like sequence moved to a take-out position, of heat reflecting units and means to support said units over and in efficient heat reflecting positions with respect to molds intermediate the charge receiving and pressing positions and between the pressing and take-out positions respectively.

4. The combination, with a glass article press wherein a plurality of molds are successively brought into a position to receive charges of plastic glass and are in like order brought into a pressing position where the charges are pressed into articles of desired form, and then in like sequence moved to a take-out position, of a heat reflecting unit and means to support said unit over and in an efficient heat reflecting position with respect to the inner surfaces of an article within a mold intermediate the pressing and take-up position, and means for creating a slight air gap between the mold and article in a mold positioned under said heat reflecting unit.

5. The combination, with a glass article press wherein a plurality of molds are successively brought into a position to receive charges of plastic glass and are in like order brought into a pressing position where the charges are pressed into articles of desired form, and then in like sequence moved to a take-out position, of a heat reflecting unit and means to support said unit over and in an efficient heat reflecting position with respect to the inner surfaces of an article within a mold intermediate the pressing and take-out position, and means for slightly lifting the article contained in a mold under said heat reflecting unit out of direct contact with the mold.

6. A mechanism for the treatment of a glass article while still in a mold in which it has been formed, which includes a heat reflecting device means for holding said device in close association with the article to reflect heat radiating from the article back into the article and associated means for creating a crevice between the article and the mold whereby heat absorbed thereby while in contact with the article as well as heat subsequently radiating from the article may be reflected and radiated back into the article.

7. In a glass working apparatus, a plurality of molds movable through loading, forming, idle, and take-out positions, a heat reflecting unit and means to support said unit over an idle position, said unit having an air supply chamber and passages communicating therewith from which streams of fluid may be directed toward the juncture of the inner mold surface and a formed article contained therein while positioned under said unit.

HENRY H. BLAU.
RAYMOND W. KELL.